(12) United States Patent
Anderson et al.

(10) Patent No.: US 11,230,927 B2
(45) Date of Patent: Jan. 25, 2022

(54) VANE AIRFOIL SHAPES FOR EMBEDDED MEMBERS

(71) Applicant: UNITED TECHNOLOGIES CORPORATION, Farmington, CT (US)

(72) Inventors: Corey D. Anderson, East Hartford, CT (US); Marianne C. Monastero, Glastonbury, CT (US); Vladimir Skidelsky, Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 150 days.

(21) Appl. No.: 16/430,191

(22) Filed: Jun. 3, 2019

(65) Prior Publication Data

US 2020/0378261 A1    Dec. 3, 2020

(51) Int. Cl.

| | | |
|---|---|---|
| *F01D 5/14* | (2006.01) | |
| *F01D 21/00* | (2006.01) | |
| *F01D 25/28* | (2006.01) | |
| *F02K 1/80* | (2006.01) | |
| *F01D 17/02* | (2006.01) | |

(52) U.S. Cl.
CPC ............ *F01D 5/141* (2013.01); *F01D 17/02* (2013.01); *F01D 21/003* (2013.01); *F01D 25/28* (2013.01); *F02K 1/80* (2013.01)

(58) Field of Classification Search
CPC . F01D 5/141; F01D 5/14; F01D 5/143; F01D 9/02; F01D 9/04; F01D 9/041; F01D 17/02; F01D 21/003; F01D 25/28; F02K 1/80; F05D 2250/32; F05D 2250/73; F05D 2260/83; G01F 1/684
See application file for complete search history.

(56) References Cited

U.S. PATENT DOCUMENTS

| | | | |
|---|---|---|---|
| 2,946,221 A | | 7/1960 | Annear et al. |
| 4,244,222 A | | 1/1981 | Hoyer et al. |
| 4,433,584 A | * | 2/1984 | Kokoszka ............... G01P 5/175 73/861.66 |
| 4,605,315 A | * | 8/1986 | Kokoszka .............. G01K 13/02 374/138 |

(Continued)

FOREIGN PATENT DOCUMENTS

| | | |
|---|---|---|
| EP | 0186609 | 7/1986 |
| FR | 3065527 | 10/2018 |

OTHER PUBLICATIONS

European Patent Office, European Search Report dated Jul. 31, 2020 in Application No. 20177764.6.

*Primary Examiner* — Courtney D Heinle
*Assistant Examiner* — Danielle M. Christensen
(74) *Attorney, Agent, or Firm* — Snell & Wilmer L.L.P.

(57) ABSTRACT

A vane assembly may comprise a plurality of airfoils each extending between an inner platform and an outer platform, the plurality of airfoils comprising a nominal airfoil, a thickened airfoil, and a first thinned airfoil circumferentially adjacent to the thickened airfoil, wherein, the nominal airfoil has a first chord thickness, the thickened airfoil has a second chord thickness, and the thinned airfoil has a third chord thickness, wherein the second chord thickness is greater than the first chord thickness and the third chord thickness is less than the first chord thickness, and a member disposed within the thickened airfoil.

18 Claims, 6 Drawing Sheets

(56) References Cited

U.S. PATENT DOCUMENTS

| | | | |
|---|---|---|---|
| 6,609,880 B2* | 8/2003 | Powis | F01D 9/02 |
| | | | 415/1 |
| 7,527,471 B2* | 5/2009 | Schilling | F01D 17/162 |
| | | | 415/118 |
| 8,182,204 B2* | 5/2012 | Durocher | F01D 25/14 |
| | | | 415/115 |
| 9,015,002 B2 | 4/2015 | Zombo et al. | |
| 9,297,720 B2* | 3/2016 | Agoos | F01D 17/06 |
| 9,970,316 B2 | 5/2018 | Radeljak et al. | |
| 2003/0177640 A1* | 9/2003 | Marques | F01D 5/005 |
| | | | 29/889.1 |
| 2014/0182292 A1 | 7/2014 | Hudon et al. | |
| 2017/0030208 A1* | 2/2017 | Hillier | F01D 25/005 |

* cited by examiner

VANE AIRFOIL SHAPES FOR EMBEDDED MEMBERS

GOVERNMENT LICENSE RIGHTS

This disclosure was made with Government support under contract DTFAWA-15-1-80010, awarded by the Federal Aviation Administration. The Government has certain rights in the disclosure.

FIELD

The disclosure relates generally to gas turbine engines and, more particularly, to embedded instrumentation for stationary airfoils such as stator vanes.

BACKGROUND

Gas turbine instrumentation such as, for example, infrared imaging sensors may be used to evaluate engine performance under operating conditions. Many systems include the imaging sensor coupled to the engine and a penetrating optical probe inserted through the engine case into the engine gas path. The presence of the probe within the gas path tends to disrupt gas path flow for downstream stages and may tend to reduce overall engine operating efficiency.

SUMMARY

In various embodiments the present disclosure provides a vane instrumentation assembly comprising a plurality of airfoils each extending between an inner platform and an outer platform, the plurality of airfoils comprising a nominal airfoil, a thickened airfoil, and a first thinned airfoil circumferentially adjacent to the thickened airfoil, wherein, the nominal airfoil has a first chord thickness, the thickened airfoil has a second chord thickness, and the thinned airfoil has a third chord thickness, wherein the second chord thickness is greater than the first chord thickness and the third chord thickness is less than the first chord thickness, and an elongate member disposed within the thickened airfoil.

In various embodiments, the elongate member comprises a probe having a sensor coupled to the probe. In various embodiments, the thickened airfoil comprises a pressure side thickened region relative to the nominal airfoil at a pressure side, and wherein the first thinned airfoil is disposed circumferentially adjacent to the pressure side thickened region. In various embodiments, the thickened airfoil comprises a suction side thickened region relative to the nominal airfoil at a suction side. In various embodiments, the first thinned airfoil is disposed circumferentially adjacent to the suction side thickened region. In various embodiments, the thickened airfoil comprises a pressure side thickened region and a suction side thickened region relative to the nominal airfoil at a respective pressure side and a suction side. In various embodiments, the first thinned airfoil is disposed circumferentially adjacent to the pressure side thickened region and a second thinned airfoil is disposed circumferentially adjacent to the suction side thickened region. In various embodiments, the thickened airfoil and the first thinned airfoil each extend between a common inner platform and a common outer platform. In various embodiments, a throat area between the thickened airfoil and the thinned airfoil is within ±5% of a throat area between the nominal airfoil and a circumferentially adjacent nominal airfoil of the plurality of airfoils. In various embodiments, the thickened airfoil and the adjacent first thinned airfoil are configured to turn a gas path flow therebetween to within ±20% of a trailing edge exit angle as the nominal airfoil.

In various embodiments the present disclosure provides a gas turbine engine comprising a compressor section configured to compress a gas, a combustor section aft of the compressor section and configured to combust the gas, a turbine section aft of the combustor section and configured to extract work from the gas, a case enclosing at least one of the compressor section, the combustor section, or the turbine section, and a vane instrumentation assembly, comprising a plurality of airfoils within the case each extending between an inner platform and an outer platform, the plurality of airfoils comprising a nominal airfoil, a thickened airfoil, and a first thinned airfoil circumferentially adjacent to the thickened airfoil, wherein, the nominal airfoil has a first chord thickness, the thickened airfoil has a second chord thickness, and the thinned airfoil has a third chord thickness, wherein the second chord thickness is greater than the first chord thickness and the third chord thickness is less than the first chord thickness, a probe disposed through a penetration in the case and within the thickened airfoil, and a sensor coupled to the probe.

In various embodiments, the thickened airfoil comprises a pressure side thickened region relative to the nominal airfoil at a pressure side. In various embodiments, the first thinned airfoil is disposed circumferentially adjacent to the pressure side thickened region. In various embodiments, the thickened airfoil comprises a suction side thickened region relative to the nominal airfoil at a suction side. In various embodiments, the first thinned airfoil is disposed circumferentially adjacent to the suction side thickened region. In various embodiments, the thickened airfoil comprises a pressure side thickened region and a suction side thickened region relative to the nominal airfoil at a respective pressure side and a suction side. In various embodiments, the first thinned airfoil is disposed circumferentially adjacent to the pressure side thickened region and a second thinned airfoil is disposed circumferentially adjacent to the suction side thickened region. In various embodiments, a throat area between the thickened airfoil and the thinned airfoil is within ±5% of a throat area between the nominal airfoil and a circumferentially adjacent nominal airfoil of the plurality of airfoils. In various embodiments, the thickened airfoil and the adjacent first thinned airfoil are configured to turn a gas path flow therebetween to within ±20% of a trailing edge exit angle as the nominal airfoil.

In various embodiments, the present disclosure provides a method of instrumenting a gas turbine engine comprising coupling a thickened airfoil circumferentially proximate a thinned airfoil on a common platform to form a vane doublet, wherein, the thickened airfoil comprises a first chord thickness and thinned airfoil comprises a second chord thickness, wherein the first chord thickness is greater than the second chord thickness, coupling the vane doublet within a case of the gas turbine engine, inserting a probe through the case and into the thickened airfoil.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
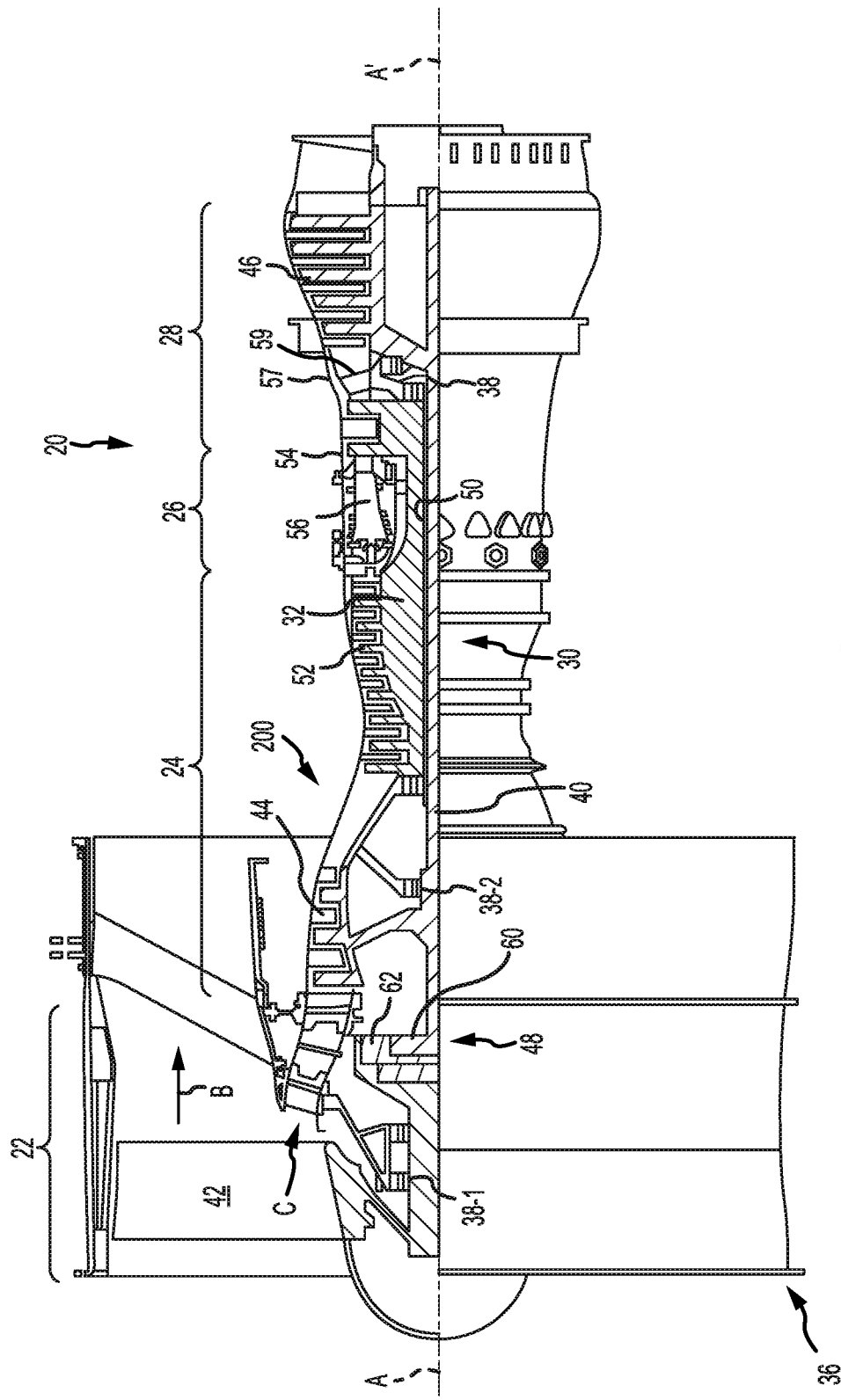
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including turbojet engines, a low-bypass turbofans, a high bypass turbofans, or any other gas turbine known to those skilled in the art.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

In various embodiments, the next generation of turbofan engines may be designed for higher efficiency which is associated with higher pressure ratios and higher temperatures in the HPC 52. These higher operating temperatures and pressure ratios may create operating environments that may cause thermal loads that are higher than the thermal loads encountered in conventional turbofan engines, which may shorten the operational life of current components.

In various embodiments, low pressure compressor 44, HPC 52, high pressure turbine 54, and low pressure turbine 46 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter). In various embodiments, a stator may include a vane assembly such as vane instrumentation assembly 200.

In various embodiments, rotors may be configured to compress (or expand) and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression (or expansion) and efficiency when the straightened air is compressed (or expanded) and spun by rotor 64.

Figure 2:
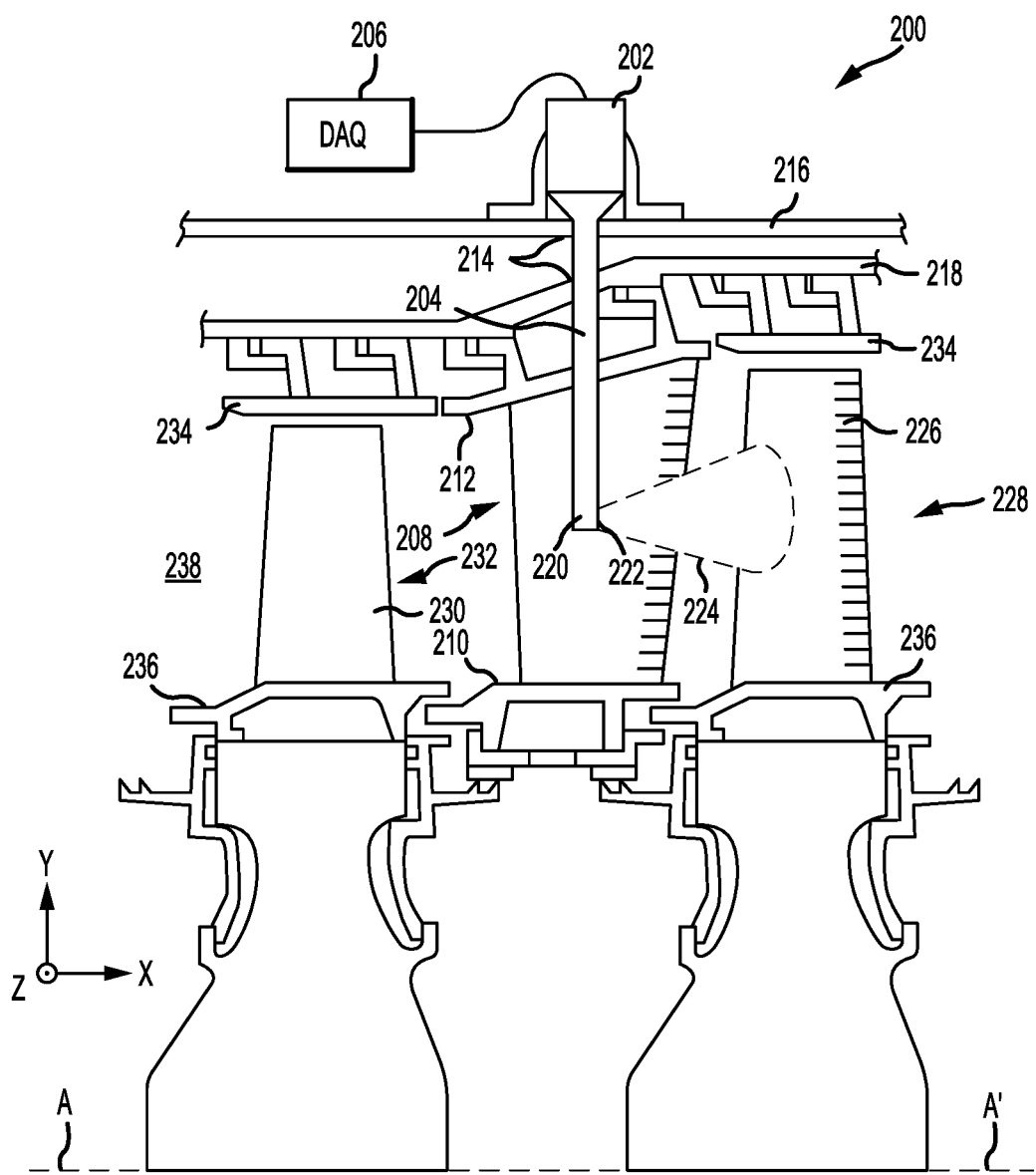
FIG. 2 illustrates vane instrumentation assembly, in accordance with various embodiments.

In various embodiments and with additional reference to FIG. 2, a vane instrumentation assembly 200 is illustrated. Vane instrumentation assembly 200 comprises a sensor 202 coupled to a probe 204. Sensor 202 may be in electronic communication with a Data Acquisition (DAQ) system 206 configured to receive sensor data from the sensor 202. Vane instrumentation assembly 200 comprises a plurality of airfoils 208 each extending into gas path 238 between an inner platform 210 and an outer platform 212. The plurality of airfoils 208 include a nominal airfoil, a thickened airfoil, and a thinned airfoil. In various embodiments, an elongate member such as, for example, the probe 204 may be inserted at penetrations 214 through outer case 216 and inner case 218 into one of the plurality of airfoils 208. In various embodiments, the probe 204 may be an optical probe comprising a probe head 220 having a field of view 224. In various embodiments, the probe head may include an optical fiber and a mirror assembly and/or a lens assembly which may orient or turn the field of view toward a region of interest.

The probe head 220 may be aligned with a window 222 of the airfoil providing the field of view 224 of the region of interest within the cases (216, 218) such as, for example an airfoil 226 of downstream rotor blade 228. Although field of view 224 is illustrated as oriented toward airfoil 226 of downstream rotor blade 228 it will be appreciated that window 222 and probe head 220 may be positioned to orient field of view 224 at any region of interest such as, for example, airfoil 230 of upstream rotor blade 232, blade outer air seals 234, blade platforms 236 and/or the like.

Figure 3:
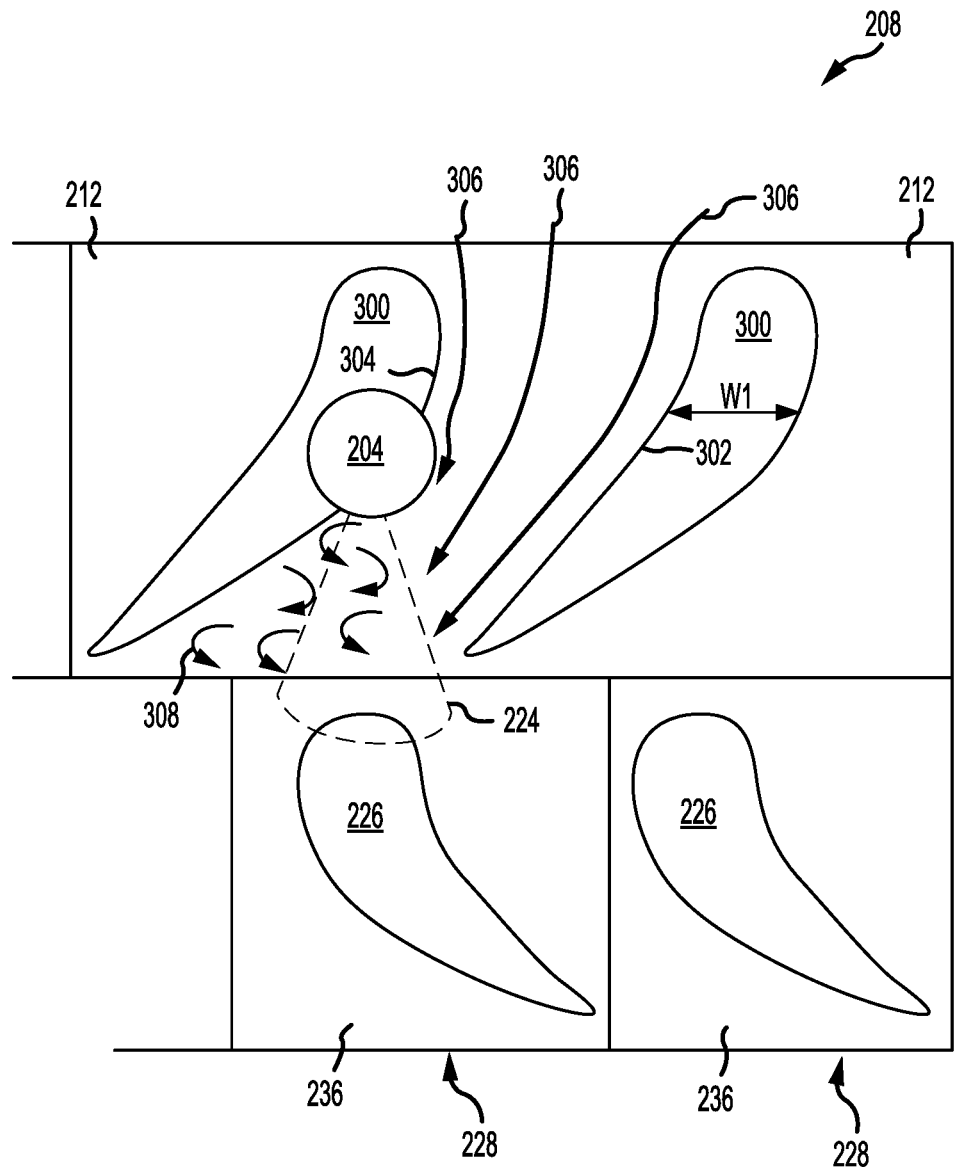
FIG. 3 illustrates a cross section through the gas path of a vane instrumentation assembly, in accordance with various embodiments.

In various embodiments and with additional reference to FIG. 3, nominal airfoils 300 of the plurality of airfoils 208 are illustrated in cross section through the gas path 238. Probe 204 is disposed within the nominal airfoil 300. The nominal airfoil 300 may have a first chord thickness W1. A gas path flow from the upstream stage encounters the nominal airfoils 300 and is turned between the respectively adjacent pressure side 302 and suction side 304 of nominal airfoils 300 as shown by streamlines 306. In various embodiments, the probe 204 may protrude from the suction side 304 of the nominal airfoil 300 tending thereby to disrupt the flow streamlines 306 and, in response, generating a separated flow as shown by arrows 308. Airfoils 226 of the downstream rotor blades 228 encounter the separated flow tending thereby to induce pressure loss, aeroacoustic vibrations, sensor measurement error, and the like.

Figure 4A:
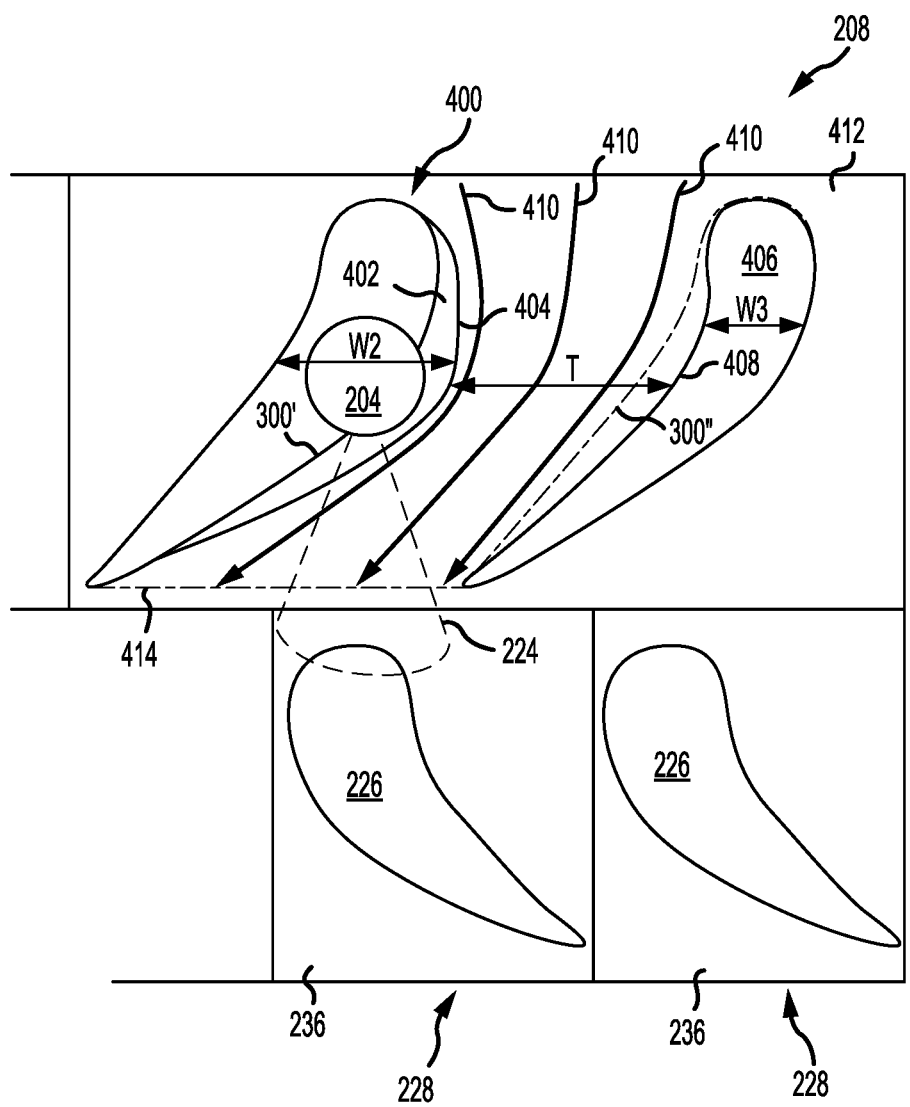
FIG. 4A illustrates a cross section through the gas path of a vane instrumentation assembly, in accordance with various embodiments.

In various embodiments and with additional reference to FIG. 4A, a thickened airfoil 400 of the plurality of airfoils 208 is illustrated. Thickened airfoil 400 comprises a suction side thickened region 402 relative to the nominal airfoil 300 (shown by overlapping outline 300') at a suction side 404. Probe 204 is embedded within the suction side thickened region 402 of the thickened airfoil 400. A thinned airfoil 406 (i.e., a first thinned airfoil) is disposed adjacent to the thickened airfoil 400 and is thinned at the pressure side 408 (i.e. reduced chord thickness relative to the nominal airfoil 300) as illustrated by nominal airfoil outline 300". In various embodiments the thickened airfoil 400 may be coupled circumferentially proximate (i.e., along a common arc described by an intersecting radial line from central longitudinal axis A-A') to the thinned airfoil 406 to extend from a common platform 412 (i.e., between a common inner platform and a common outer platform) to form a vane doublet.

As shown by outlines 300' and 300" each of the thickened airfoil 400 and the thinned airfoil 406 may comprise a similar chord length and/or camber to the nominal airfoil 300 but may differ in chord thickness. In various embodiments, each of the thickened airfoil 400, the thinned airfoil 406, and the nominal airfoil 300 may have an identical chord length. For example, the thickened airfoil comprises a second chord thickness W2 and the thinned airfoil 409 comprises a third chord thickness W3. The second chord thickness W2 is greater than the first chord thickness W1 and the third chord thickness W3 is less than the first chord thickness W1. Stated another way, the second chord thickness W2 is greater than the third chord thickness W3 and the first chord thickness W1. In various embodiments, W2 may be between 5% and 100% greater than W1 and W3 may be between 5% and 90% of W1. In this regard, the gas path flow from the upstream stage encountering the thickened airfoil 400 and the thinned airfoil 406 may be turned as illustrated by streamlines 410 between the respective suction side 404 and pressure side 408 tending thereby to inhibit generating the separated flow. In this regard, the thickened airfoil 400 and the adjacent thinned airfoil 406 are configured to turn the gas path flow therebetween to an identical trailing edge exit angle (defined between the trailing edge exit plane 414 and the streamlines 410) as the nominal airfoil 300. In various embodiments, each of the thickened airfoil 400, the thinned airfoil 406, and the nominal airfoil 300 may have respective leading edges and trailing edges aligned along a common arc described by an intersecting radial line from central longitudinal axis A-A'. In this regard, each of the thickened airfoil 400, the thinned airfoil 406, and the nominal airfoil 300 may have an identical leading edge position and/or trailing edge position along the longitudinal axis.

Figure 4B:
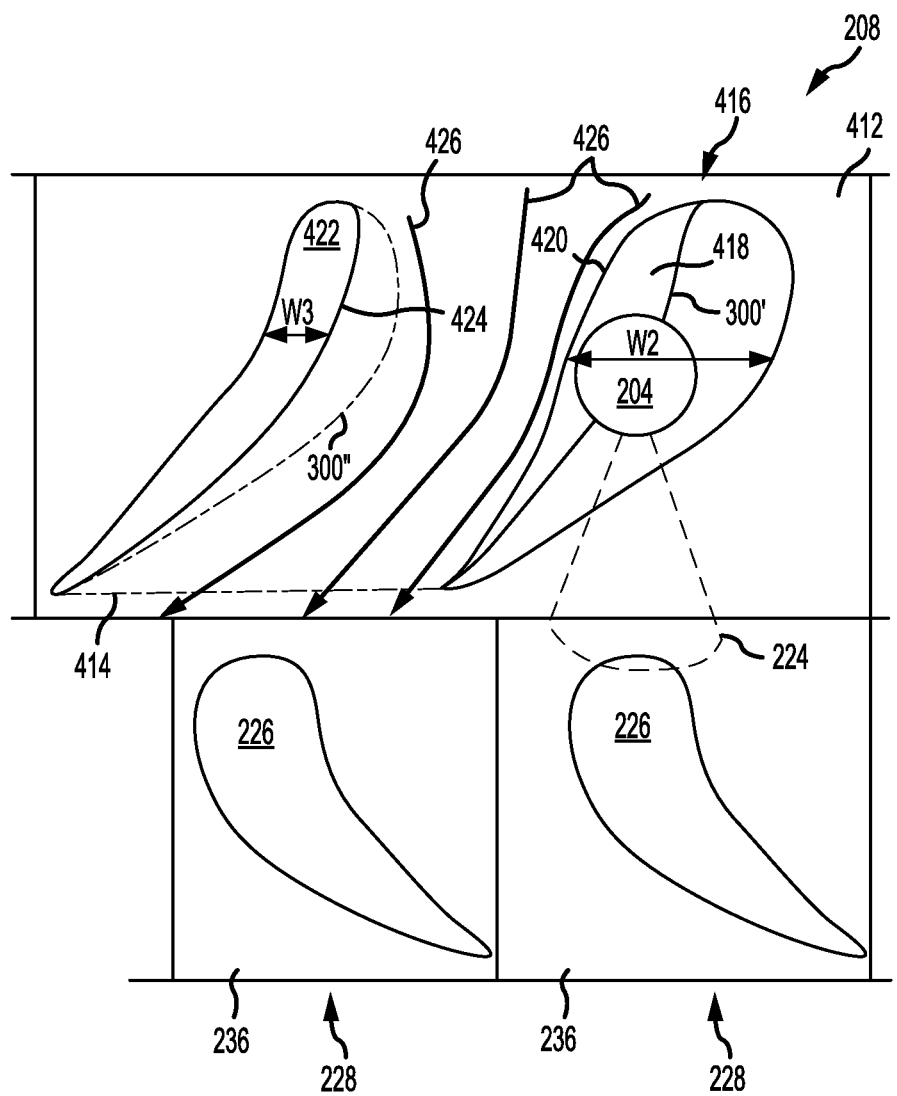
FIG. 4B illustrates a cross section through the gas path of a vane instrumentation assembly, in accordance with various embodiments.

In various embodiments and with additional reference to FIG. 4B a thickened airfoil 416 of the plurality of airfoils 208 is illustrated. Thickened airfoil 416 comprises features, geometries, construction, manufacturing techniques, and/or internal components similar to thickened airfoil 400. Thickened airfoil 416 differs in comprising a pressure side thickened region 418 relative to the nominal airfoil 300 (shown by overlapping outline 300') at a pressure side 420. Probe 204 is embedded within the pressure side thickened region 418 of the thickened airfoil 416. A thinned airfoil 422 (i.e., a second thinned airfoil) is disposed adjacent to the thickened airfoil 416 and is thinned at the suction side 424 (i.e. reduce chord thickness relative to the nominal airfoil 300) as illustrated by nominal airfoil outline 300". In various embodiments the thickened airfoil 416 may be coupled circumferentially proximate the thinned airfoil 422 to extend from the common platform 412 to form the vane doublet.

As shown by outlines 300' and 300" each of the thickened airfoil 416 and the thinned airfoil 422 may comprise an identical chord length to the nominal airfoil 300 but may differ in chord thickness. In this regard, the gas path flow from the upstream stage encountering the thickened airfoil 416 and the thinned airfoil 422 may be turned as illustrated by streamlines 426 between the respective pressure side 420 and suction side 424 tending thereby to inhibit generating the separated flow. In this regard, the thickened airfoil 416 and the adjacent thinned airfoil 422 are configured to turn the gas path flow therebetween to an identical trailing edge exit angle (defined between the trailing edge exit plane 414 and the streamlines 426) as the nominal airfoil 300.

Figure 4C:
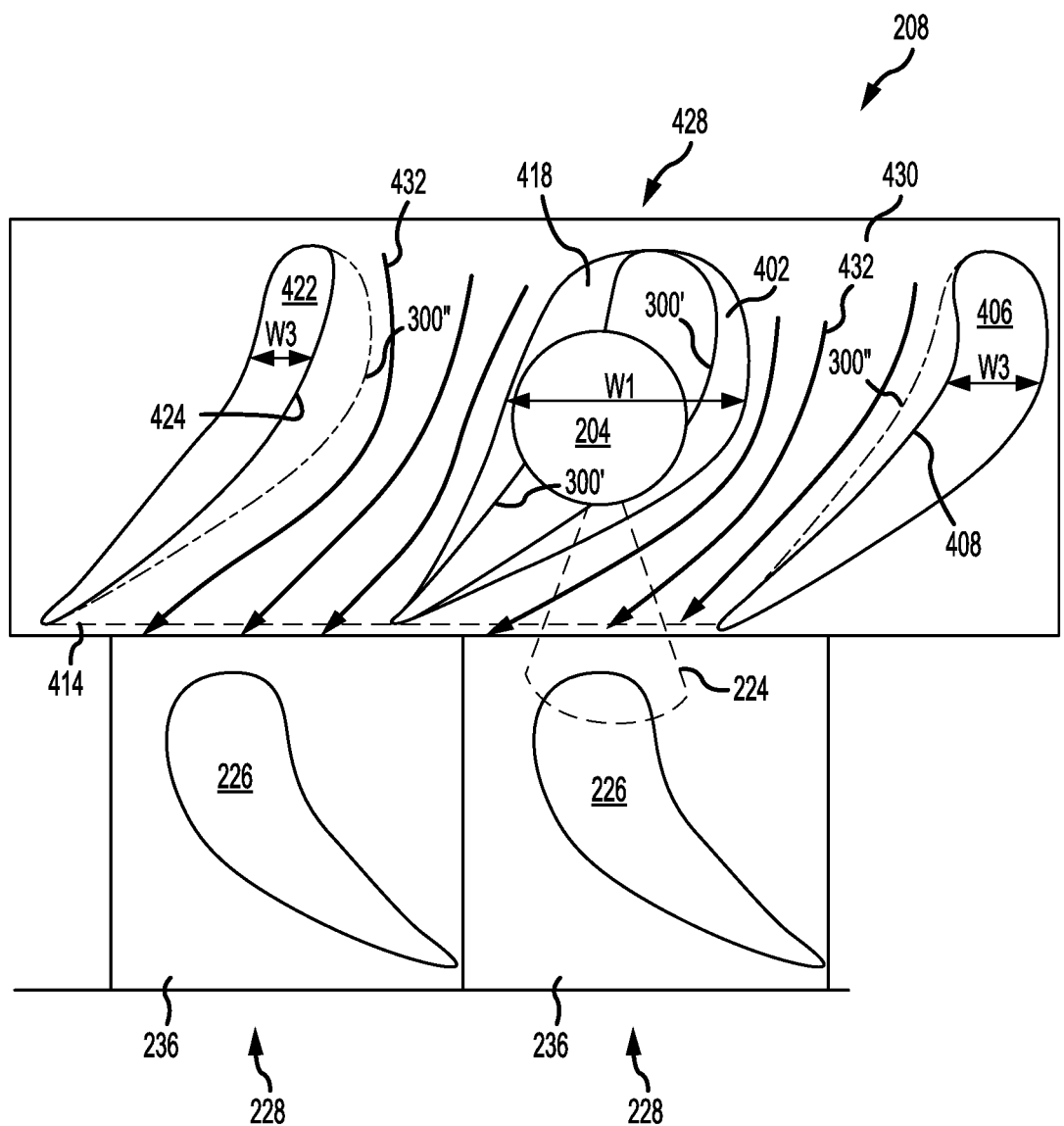
FIG. 4C illustrates a cross section through the gas path of a vane instrumentation assembly, in accordance with various embodiments.

In various embodiments and with additional reference to FIG. 4C, a thickened airfoil 428 of the plurality of airfoils 208 is illustrated. Thickened airfoil 428 comprises features, geometries, construction, manufacturing techniques, and/or internal components similar to thickened airfoil 400 and thickened airfoil 416. Thickened airfoil 428 differs in comprising both the pressure side thickened region 418 and the suction side thickened region 402 relative to the nominal airfoil 300 (shown by overlapping outlines 300'). Probe 204 is embedded within the pressure side thickened region 418 and the suction side thickened region 402 of thickened airfoil 428. Thinned airfoil 422 is disposed adjacent to the pressure side thickened region 418 and thinned airfoil 406 is disposed adjacent to the suction side thickened region 402. In various embodiments, the thickened airfoil 428 may be coupled relatively circumferentially between the first thinned airfoil and the second thinned airfoil to and extend from a common platform 430 and thereby form a vane triplet.

As shown by outlines 300' and 300" each of the thickened airfoil 428 and the thinned airfoils (406, 422) may comprise an identical chord length to the nominal airfoil 300 but may differ in chord thickness. For example, a thickened airfoil may have a chord thickness between 5% and 50% greater than the chord thickness of the nominal airfoil and a thinned airfoil may have a chord thickness between 5% and 50% less than the chord thickness of the nominal airfoil. In this regard, the gas path flow from the upstream stage encountering the thickened airfoil 428 and the thinned airfoils (406, 422) may be turned as illustrated by streamlines 432 between the thickened airfoil 428 and each of the respectively adjacent thinned airfoils (406, 422) tending thereby to inhibit generating the separated flow. In this regard, the thickened airfoil 428 and the adjacent thinned airfoils (406, 422) are configured to turn the gas path flow therebetween to an identical trailing edge exit angle (defined between the trailing edge exit plane 414 and the streamlines 432) as the nominal airfoil 300.

In various embodiments, the distance between a thickened region of a thickened airfoil (such as suction side thickened region 402 of thickened airfoil 400) and a corresponding surface of a thinned airfoil (such as pressure side 408 of thinned airfoil 406) may define a throat area. Stated another way and with brief reference to FIG. 4A, a throat area may be defined by the minimum distance T between the suction side of a first airfoil (such as suction side 404 of thickened airfoil 400) and the pressure side of a radially adjacent airfoil (such as pressure side 408 of thinned airfoil 406). In various embodiments, the throat area between a thickened airfoil and an adjacent thinned airfoil may be about 98% of a throat area between adjacent nominal airfoils 300. In various embodiments, the throat area between a thickened airfoil and an adjacent thinned airfoil may be within ±5% of the throat area between adjacent nominal airfoils 300. In various embodiments, the trailing edge exit angle for a thickened airfoil and an adjacent thinned airfoil may be within about ±20% or may be within about ±65% of a trailing edge exit angle for adjacent nominal airfoils 300.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A vane assembly, comprising:
a plurality of airfoils each extending between an inner platform and an outer platform, the plurality of airfoils comprising a nominal airfoil, a thickened airfoil, and a first thinned airfoil circumferentially adjacent to the thickened airfoil,
wherein, the nominal airfoil has a first chord thickness and a first chord length, the thickened airfoil has a second chord thickness and a second chord length, and the thinned airfoil has a third chord thickness and a third chord length, wherein the second chord thickness is greater than the first chord thickness and the third chord thickness is less than the first chord thickness, and wherein at least one of the second chord length and the third chord length is substantially equal to the first chord length; and
a probe disposed within the thickened airfoil,
wherein a throat area between the thickened airfoil and the thinned airfoil is within ±5% of a throat area between the nominal airfoil and a circumferentially adjacent nominal airfoil of the plurality of airfoils.

2. The vane assembly of claim 1, wherein the probe is an optical probe including an optical fiber and at least one of a mirror assembly or lens assembly, wherein the thickened airfoil further comprises a window.

3. The vane assembly of claim 2, wherein the thickened airfoil comprises a pressure side thickened region relative to the nominal airfoil at a pressure side, and wherein the first thinned airfoil is disposed circumferentially adjacent to the pressure side thickened region.

4. The vane assembly of claim 1, wherein the thickened airfoil comprises a suction side thickened region relative to the nominal airfoil at a suction side.

5. The vane assembly of claim 4, wherein the first thinned airfoil is disposed circumferentially adjacent to the suction side thickened region.

6. The vane assembly of claim 1, wherein the thickened airfoil comprises a pressure side thickened region and a suction side thickened region relative to the nominal airfoil at a respective pressure side and a suction side.

7. The vane assembly of claim 6, wherein the first thinned airfoil is disposed circumferentially adjacent to the pressure side thickened region and a second thinned airfoil is disposed circumferentially adjacent to the suction side thickened region.

8. The vane assembly of claim 1, wherein the thickened airfoil and the first thinned airfoil each extend from a common platform.

9. The vane assembly of claim 1, wherein the thickened airfoil and the adjacent first thinned airfoil are configured to turn a gas path flow therebetween to within ±20% of a trailing edge exit angle as the nominal airfoil.

10. A gas turbine engine, comprising:
a compressor section configured to compress a gas;
a combustor section aft of the compressor section and configured to combust the gas;
a turbine section aft of the combustor section and configured to extract work from the gas;
a case enclosing at least one of the compressor section, the combustor section, or the turbine section;
and a vane instrumentation assembly, comprising:
a plurality of airfoils within the case each extending between an inner platform and an outer platform, the plurality of airfoils comprising a nominal airfoil, a thickened airfoil, and a first thinned airfoil circumferentially adjacent to the thickened airfoil,
wherein, the nominal airfoil has a first chord thickness and a first chord length, the thickened airfoil has a second chord thickness and a second chord length, and the thinned airfoil has a third chord thickness and a third chord length, wherein the second chord thickness is greater than the first chord thickness and the third chord thickness is less than the first chord thickness, and wherein at least one of the second chord length and the third chord length is substantially equal to the first chord length;
a probe disposed through a penetration in the case and within the thickened airfoil; and a sensor coupled to the probe,
wherein a throat area between the thickened airfoil and the thinned airfoil is within ±5% of a throat area between the nominal airfoil and a circumferentially adjacent nominal airfoil of the plurality of airfoils.

11. The gas turbine engine of claim 10, wherein the thickened airfoil comprises a pressure side thickened region relative to the nominal airfoil at a pressure side.

12. The gas turbine engine of claim 11, wherein the first thinned airfoil is disposed circumferentially adjacent to the pressure side thickened region.

13. The gas turbine engine of claim 10, wherein the thickened airfoil comprises a suction side thickened region relative to the nominal airfoil at a suction side.

14. The gas turbine engine of claim 13, wherein the first thinned airfoil is disposed circumferentially adjacent to the suction side thickened region.

15. The gas turbine engine of claim 10, wherein the thickened airfoil comprises a pressure side thickened region and a suction side thickened region relative to the nominal airfoil at a respective pressure side and a suction side.

16. The gas turbine engine of claim 15, wherein the first thinned airfoil is disposed circumferentially adjacent to the pressure side thickened region and a second thinned airfoil is disposed circumferentially adjacent to the suction side thickened region.

17. The gas turbine engine of claim 10, wherein the thickened airfoil and the adjacent first thinned airfoil are configured to turn a gas path flow therebetween to within ±20% of a trailing edge exit angle as the nominal airfoil.

18. A method of instrumenting a gas turbine engine, the method comprising:
coupling a thickened airfoil circumferentially proximate a thinned airfoil on a common platform to form a vane doublet,
wherein, the thickened airfoil comprises a first chord thickness and a first chord length and the thinned airfoil comprises a second chord thickness and a second chord length, wherein the first chord thickness is greater than the second chord thickness, and wherein the first chord length is substantially equal to the second chord length,
wherein a throat area between the thickened airfoil and the thinned airfoil is within ±5% of a throat area between a nominal airfoil and a circumferentially adjacent nominal airfoil of the plurality of airfoils;
coupling the vane doublet within a case of the gas turbine engine;
inserting a probe through the case and into the thickened airfoil; and
aligning a probe head of the probe with a window of the thickened airfoil of the vane doublet.

* * * * *